United States Patent
De Smet

(10) Patent No.: US 6,434,449 B1
(45) Date of Patent: Aug. 13, 2002

(54) METHOD AND DEVICE FOR AUTOMATED ROBOT-CELL CALIBRATION

(76) Inventor: Pierre De Smet, 830 Highwood, Bloomfield Hills, MI (US) 48304

( * ) Notice: Subject to any disclaimer, the term of this patent is extended or adjusted under 35 U.S.C. 154(b) by 0 days.

(21) Appl. No.: 09/631,481

(22) Filed: Aug. 3, 2000

(51) Int. Cl.$^7$ .............................................. G05B 19/04
(52) U.S. Cl. ...................... 700/254; 700/247; 700/251; 700/252; 700/259; 700/262; 700/264; 318/568.1; 318/568.11; 318/568.14; 901/9; 901/42; 901/47; 414/730
(58) Field of Search ................................ 700/254, 259, 700/251, 262, 252, 264, 900, 247, 249; 318/568.11, 574, 568.1, 568.14; 414/5, 730; 901/42, 47, 14, 2, 3, 9; 702/104, 105, 150; 382/153

(56) References Cited

U.S. PATENT DOCUMENTS

| | | |
|---|---|---|
| 4,727,471 A | 2/1988 | Driels et al. |
| 4,753,569 A | 6/1988 | Pryor |
| 4,842,475 A | 6/1989 | Driels |
| 5,079,043 A * | 1/1992 | Lambert ..................... 427/448 |
| 5,148,591 A | 9/1992 | Pryor |
| 5,297,238 A | 3/1994 | Wang et al. |
| 5,400,638 A | 3/1995 | Kim |
| 5,506,682 A | 4/1996 | Pryor |
| 5,602,967 A | 2/1997 | Pryor |
| 5,608,847 A | 3/1997 | Pryor |
| 5,910,719 A | 6/1999 | Thorne |
| 6,295,708 B1 * | 10/2001 | Spaid et al. ............... 29/81.02 |
| 6,324,444 B1 * | 11/2001 | Wakaizumi et al. ... 318/568.11 |
| 6,330,492 B1 * | 12/2001 | Wisniewski et al. ..... 144/114.1 |

FOREIGN PATENT DOCUMENTS

| | | |
|---|---|---|
| WO | WO 99/36216 | 7/1999 |

OTHER PUBLICATIONS

Automated Partial Pose Measurement System for Manipulator Calibration Experiments, Morris R. Driels, Member, IEEE, and William E. Swayze 1994.
Simultaneous Calibration of a Robot and a Hand–Mounted Camera, Hangqi Zhuang, Senior Member, IEEE, Kuanchih Wang, Memeber IEEE, and Zvi S. Roth, Senior Member IEEE 1995.
Global Calibration of a Robot Vision System, G.V. Puskorius and L.A. Feldkamp 1987.
A New Technique for Fully Autonomous and Efficient 3D Robotics Hand/Eye Calibration, Roger Y. Tsai and Reimar K. Lenz 1989.
Autonomous Robot Calibration for Hand–Eye Coordination, David J. Bennett, Davi Geiger, John M. Hollerbach 1991.
Chapter 4—Pose Measurement with Cameras, 14 pages 1995.
Chapter 7—Simultaneous Calibration of a Robot and a Hand–Mounted Camera, 9 pages 1995.
Zhuang et. al., Camera–assisted calibration of SCARA arms Intelligent Robots and System 95. 'Human Robot Interaction and Cooperative Robots', Proceedings. IEEE/RSJ International Conference on vol.: 1, pp.: 507–512 vol. 1 1995.
Maule et al., Robots for raid prototyping and for tooling of high volume workpieces, 1998, IEEE, pp. 1941–1945.*
Coulter et al., An application of tool insertion using model–based vision, 1991, IEEE, pp. 316–319.*
Hills, Dynalog introduces the dyncal robot cell calibration system, Internet, 1986, pp. 1–2.*
Application report, Lasers measure too center points, Internet, 1999, pp. 1–2.*

* cited by examiner

*Primary Examiner*—William A. Cuchlinski, Jr.
*Assistant Examiner*—McDieunel Marc

(57) ABSTRACT

A system and a method for re-calibrating a robot, an end-effectuator of the robot and a fixture for holding a production part based upon measurements recorded by a sensor after contact or interception with random points along the three-dimensional contour of the end-effectuator of the robot.

24 Claims, 5 Drawing Sheets

METHOD AND DEVICE FOR AUTOMATED ROBOT-CELL CALIBRATION

BACKGROUND OF INVENTION

1. Field of the Invention

The present invention relates generally to calibration of components of a robot-cell including an industrial robot (robot), the tool center point of the end-effector (TCP) attached to the robot's flange, and additionally the fixture or positioner holding the production part upon which the robot performs some operation. Further, a preferred embodiment of the present invention relates to the automatic/"on-line" calibration of a robot and its TCP based on the measurements recorded by a sensor after contact or interception with random points along the three-dimensional contour of the end-effector close to the TCP.

2. Description of the Prior Art

Systems which employ the current state of technology for calibration of a robot and its TCP consist of two basic types: (1) "target-based" systems which can identify the robot, the fixture and TCP parameters but require the operator to attach one or more measurement target(s) at or near the physical location of the TCP; and (2) "search/feedback" systems which identify only TCP parameters but do not require operator intervention.

"Target-based" systems generally offer the benefit of allowing identification of robot parameters as well as fixture and TCP parameters. Traditionally these systems include an external measurement system including, but not limited to, a laser interferometer, a photogrammetry system, a theodolite system, or an optomechanical system with one or more measurement cables. In order to acquire measurement data used in the calibration process, each of these systems requires attachment of a target—or in the case of optomechanical systems an adaptor—to one or more points at or near the physical TCP to be identified. Cost of the external measurement system and the requirement for operator intervention are the primary reasons that "target-based" systems are not considered suitable for use as an automated/"on-line" solution for identification of robot and TCP parameters.

In terms of suitability for use as an automated calibration solution, "search/feedback" systems possess a clear advantage over "target-based" systems—they do not require attachment of targets or other modification of the end-effector itself—thus eliminating the need for operator intervention in the calibration process. These systems traditionally include a "low resolution" sensor—as low as "1 bit" (i.e. "on/off" or "binary") as is the case in either an optical beam, a proximity switch, or an electric contact, for example. As the TCP either breaks the optical beam or makes contact with the proximity switch, the robot position reported by the controller is recorded for use in the TCP identification process. As a consequence, the speed at which the robot moves toward either the optical beam or the proximity switch is inversely related to the accuracy of the identification process (i.e. a very slow robot speed is required to record highly accurate robot position information at the moment the TCP breaks the optical beam, for example). Furthermore, even though these "search/feedback" systems do not require specific measurement targets (as do the "target-based" systems), they still require the end-effector to intercept or contact the measurement sensor at specific and pre-determined locations with respect to the TCP. For that reason, the robot needs to approach the sensor in a methodical manner in order to "search"—through feedback—for the appropriate locations along the end-effector for the measurement sensor to intercept or contact (also referred to as "profiling" of the end-effector).

Furthermore, these "search/feedback" systems often only identify TCP parameters—they do not identify robot-related parameters. Moreover, these "search/feedback" systems possess several significant limitations as they typically require: (1) an initial approximation of the TCP values; (2) significant integration with the robot controller to establish a feedback loop which causes the TCP, for example, to break the optical beam several times; and (3) a significant amount of time for the robot to drive the TCP, for example, to break the optical beam several times.

Finally, the resulting accuracy of the TCP parameters identified with the "search/feedback" systems depends directly upon the following factors: (1) the extent to which the robot itself is already properly "calibrated" (i.e. such "low resolution" methods rely on the robot reporting its absolute position accurately in order to perform calibration of the TCP with accuracy); and (2) typically also the extent to which the TCP maintains a specific (and assumed upfront) orientation relative to the optical beam, proximity switch, or electrical contact.

SUMMARY OF THE INVENTION

In contrast to the "target-based" and "search/feedback" systems described above, the present invention involves a method for identification of both robot and TCP parameters and additionally the location of the measurement sensor, thus also either the location of the stationary fixture or other parameters of the multi-axis positioner. Further, in a preferred embodiment of the present invention, the robot and end-effector can be recalibrated quickly during operation, even between cycles of a production robot program—without operator intervention. Moreover, the present invention eliminates several obstacles presented by some "search/feedback" systems as the present invention: (1) can eliminate the need for an initial approximation of the TCP values; (2) can eliminate the need for a complex feedback loop (i.e. it can be controller independent, thereby, also reducing the amount of time required to perform the complete process); and (3) can reduce restrictions upon the motion of the TCP (i.e. orientation of contact with "on/off" sensor). Finally, the present invention eliminates the dependency upon proper "mastering" of the robot as the "true" joint offsets (or even more robot parameters if needed) are identified in the process of automatically identifying these and other robot parameters.

The present invention achieves these advantages by providing a method and apparatus for calibrating the robot and end-effector together with the location of the measurement sensor if needed (and therefore potentially the fixture on which the sensor(s) is or are located) based upon a mathematical description of the 3D contour of the tip of the end-effector. Further, in contrast to the "search/feedback" systems, the present invention proposes as one embodiment the use of a "high-resolution" displacement sensor rather than a "low resolution" sensor (even as low as "binary" or "on/off") such as an optical beam or a proximity switch for example. A "high-resolution" sensor allows the robot to stop literally anywhere within the sensor's measurement range without the need for robot controller feedback, in turn allowing higher robot speeds and thus shorter cycle times.

Once the 3D contour of the tip of the end-effector has been described relative to the location of the TCP, the calibration system allows identification of both robot and TCP parameters (together with the location of the measurement sensor if needed, and therefore potentially the fixture and/or positioner) with only two additional pieces of information: (1) a set of measurements recorded by the measurement sensor following contact or interception with several points along the contour of the tip of the end-effector; and (2) the corresponding robot program which caused the tip of the end-effector to make contact with or intercept the measurement sensor.

DETAILED DESCRIPTION OF THE PREFERRED EMBODIMENT

Figure 1:
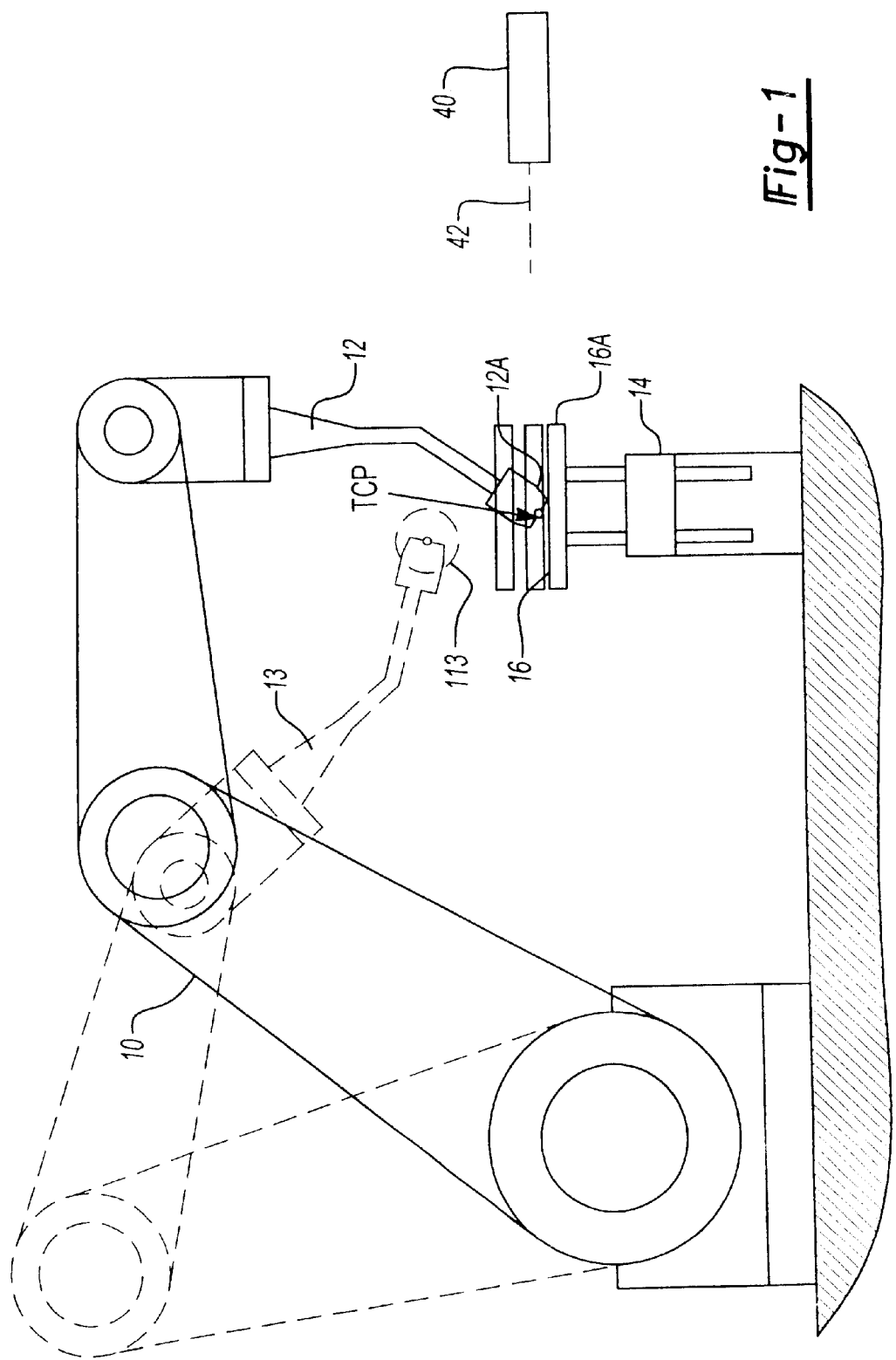
FIG. 1 is a diagrammatic view of the robot apparatus of the present invention.

As can best be seen in FIG. 1, the present invention includes a robot 10 having an end-effector 12. A measurement sensor 14 is positioned within the working envelope of the end-effector 14 with a sensing area 16 disposed in a position to be engaged by the end-effector 12 of the robot 10. The sensing area 16 is disposed to include the TCP of the end-effector 12 of the robot.

Figure 2:
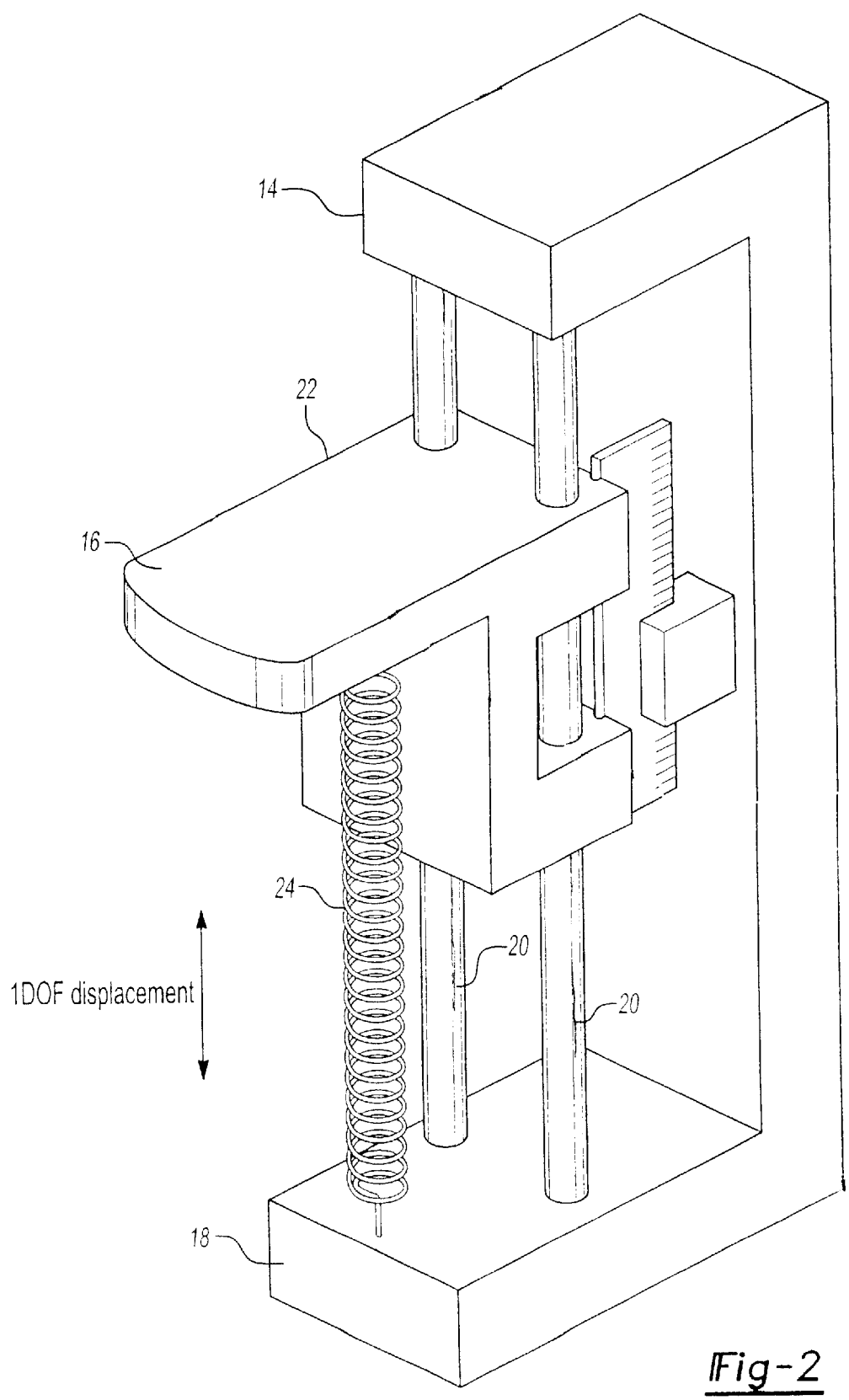
FIG. 2 is a diagrammatic view of a measurement sensor for use in the apparatus shown in FIG. 1.

As can best be seen in FIG. 2, one embodiment of the measurement sensor 14 of the present invention is a flat surface 16 (with known edges if necessary) moving translationally in the direction of the arrows in one degree of freedom, of which linear displacement is measured. The sensor 14 includes a support stand 18 supporting upstanding rods 20 which slidably support a displacement block 22, the upper surface 16 of which forms the sensing area. A compression spring 24 urges the block 22 upwardly and a displacement sensor 26 carried by the support stand 18 and engaging the block 22 measures the displacement of the sensing surface 16 of the block 22.

Another embodiment for example includes two perpendicular surfaces both rotating along a single axis, of which the rotation can be measured by a variety of sensors (e.g. potentiometer, optical encoder, etc.).

Figure 3:
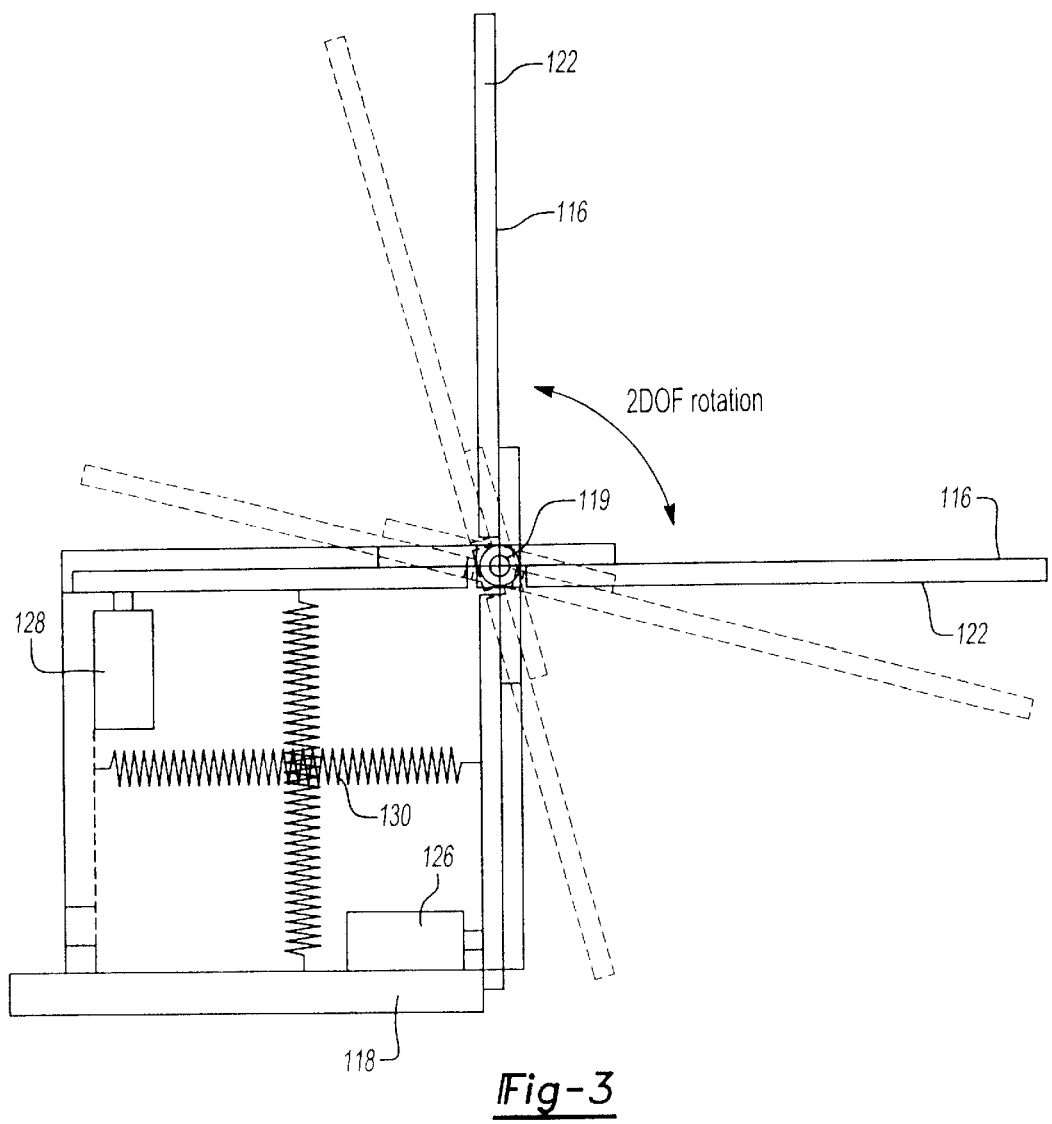
FIG. 3 is a diagrammatic view of another preferred measurement sensor for use in the present invention.

These two embodiments which involve "high resolution" measurement sensors removing the requirement of "feedback" with the robot, can also be offered in a "low resolution" version using one or more electric switches for example in cases where feedback and integration with the robot controller is possible (see FIG. 3); another solution would even be to use "fixed surfaces" and to program the robot to stop once it hits such surfaces either through torque sensing on the robot motors, or through electric contact with the robot end-effector, for example.

Contrary to the "high-resolution" ones, these "low-resolution" sensors require some sort of feedback from the robot (to know at what point in space the robot hits the surface), which in turn requires some level of integration with the robot controller. One way to eliminate this feedback requirement is to calculate the robot's position when hitting the surface based on the time and the (constant) speed at which the robot travels from its starting position. That way only the initial robot positions and directions of motion need to be known. Because of the inaccurate knowledge of the exact—but typically very repeatable—speed profile of the robot (especially at start), this method is particularly attractive and reliable for "recovery" calibration (see explanation below) where the "difference" in position (from "before and after") matters more than the position itself.

In any case, different embodiments using multiple contact surfaces in different configurations (e.g. three surfaces perpendicular one to another) can of course be considered. In all these cases of embodiments using "contact surfaces", the sensor—whether "high resolution" or "low resolution"—will be activated by (in other words "measure") the end-effector (or other mechanical component which is positioned with a fixed relation to the TCP to be calibrated) hitting or making contact with these surfaces and/or with any of its edges.

FIG. 2 illustrates diagrammatically a measurement sensor 114 for use in a "low resolution" system of the present invention. The measurement sensor 114 includes a pair of sensing plates 122 each having a sensing surface 116. The plates 122 are pivotally mounted to a support stand 118 at 119 to be 90° apart as shown in the rest position. Springs 130 urge the plates 122 to the rest position.

Switches 126 and 128 are actuated by the sensing plates 122 when the sensing plates 122 are rotated to an actuating position.

When either of the surfaces 116 on the sensing plates 122 is engaged by the end effector 12 (FIG. 1) and rotated to actuate either the switch 126 or 128, the position of the end effector 12 is sensed and the information is fed back to the robot control.

It should be apparent that the embodiment shown in FIG. 2 could be instead a high resolution system. This would be accomplished by replacing the switches 126 and 128 with potentiometers or optical encoders or any other means of measuring the rotation of the plates 122 and to feed that information back to the robot control.

But all embodiments do not have to rely on such "contact surfaces". As shown diagrammatically in FIG. 1 another embodiment, for example, uses a single laser beam sensor 40 in a "low resolution", actually even a "binary" mode. In this case, the sensor 40 is activated as soon as the end-effector cuts (or intercepts) the laser beam, just as in the case of the end-effector 12 hitting the edge 16A (i.e. in the case of a single line edge) of a contact surface 16. In general anyway, the principal benefit of embodiments which include a sensor with more than one degree of freedom is the fact that several measurement data are recorded at each robot positions, thereby reducing the number of robot positions required to complete the calibration process.

Whatever the physical embodiment of the measurement sensor, the calibration process in this invention relies on one or more specific mechanical components attached to the robot to make contact with or intercept the measurement sensor at different (random) points along its 3D contour as commanded by a specific calibration robot program. Then, based on the mathematical description or function of the 3D contour of this (these) mechanical component(s), the proper location of these different contact or interception points along that contour can be calculated. As a result, the robot, the TCP's end-effector, and—if desired by the operator—the location of the measurement sensor (therefore—by mounting the sensor at several locations—also the location of the fixture and additional parameters of the fixture if the fixture consists of a single or multi-axis positioner) are calibrated at the same time.

The tip 12A of the end-effector 12 itself where the TCP is located is typically the one mechanical component used to contact or intercept the measurement sensor (as further assumed in the description below). However, if the TCP does not need to be calibrated, any other mechanical component(s) as shown diagrammatically at 13 in FIG. 1, attached at the flange of the robot, or even elsewhere on the robot (if certain axes do not need to be calibrated) can be used. Typically, these mechanical component(s) should be in a "rigid" (or constant) relation one to another, so that their mathematical description or function remains correct. However, in case of a "non-rigid" relation, calibration can still occur, for example, by using some mechanical components (e.g. the tip of the end-effector) and their mathematical function to accurately define the TCP's x,y,z, while allowing the other mechanical components (e.g. some less rigid parts on a spot weld gun) to mathematically "float" in order to more "loosely" define the TCP's orientation.

This mathematical function (F) of the 3D contour of the mechanical component (further assumed to be the end-effector's tip) used to contact or intercept the measurement sensor can be obtained principally in two ways. The first method is to know up-front the function F(TCP) describing the 3D contour relative to the desired TCP frame of the end-effector's tip area susceptible to contact or intercept the measurement sensor during the calibration program. The second method is to learn the function F(TCP) describing the 3D contour relative to the existing TCP frame of the area in the close neighborhood of each one of the actual contact or interception points (by measuring the end-effector's tip multiple times in "slightly" different orientations from the original one, and fitting an appropriate function F(TCP) to these measurements).

With the first method (where the 3D contour is "known up-front" with respect to the desired TCP) and contrary to the second method (where the contour is "learned"), "accuracy" calibration can be performed to calculate the desired or "initial" TCP as well as the whole "true" robot and the location of the measurement sensor (and potentially thus also the fixture and/or positioner). Therefore, whenever "true" or "accurate" calibration is required, a mechanical component with known 3D contour should be used to contact or intercept the measurement sensor. In cases where the tip of the end-effector itself is difficult to describe mathematically up-front (because of too complex geometry), then a special artifact, as shown diagrammatically in FIG. 1 at 113, with a known and easily definable 3D contour can be temporarily attached in a known relation to the end-effector's TCP to be calibrated. This artifact 113 could, for example, be one sphere with its center attached right at the TCP (in which case only the TCP's x,y,z can be calibrated), or a cylinder (in which case the orientation around cylinder's axis can not be calibrated) or a star with at least three spheres (so the orientation can be calibrated although it does not need to—but it can—be used for the TCP itself, in case the orientation of the star relative to the TCP is unknown), or any other imaginable artifact that can be described mathematically easily. Temporary attachment of such artifact, as shown at 12A in FIG. 1, at the end-effector's TCP can also be used and is typically a manual operation of course (although it certainly could be automated), but that is not an issue in the typical case of a "one-time-only" accurate TCP and/or robot calibration. Alternatively, this artifact 12A could be permanently built into the end-effector 12 (e.g. 3 or more spheres mounted along a spot-weld gun) as long of course as it does not interfere with the end-effector's normal production operation.

On the contrary, "recovery" calibration does not per se try to calculate the "true" or "accurate" robot, TCP, fixture, and/or positioner. Instead, it sets the robot, TCP, etc. back to wherever it originally was, without any concern of how "accurate" or "true" the robot, TCP, etc. are. In this case, the method where the 3D contour is "learned" is convenient as the Identification process defines the contour with respect to the robot, TCP, etc., however inaccurate these robot, TCP, etc. are! Any subsequent calibration will then simply reset the robot, TCP, etc. back to what was identified during that Identification process. Of course, in the case of a "known up-front" contour, "recovery" calibration can be performed in the same manner, with the added advantage that the "recovered" robot, TCP, etc. simply also happened to be "accurate"! The advantage of "learning" the contour is that it allows end-effectors even with complex contours to be described mathematically, therefore eliminating the need for a special artifact without any modification to the end-effector, in turn allowing fully automatic on-line "recovery" calibration.

So, a typical procedure to calibrate, for example, the robot, and TCP (x,y,z and orientation) as well as the measurement sensor's location for "accuracy" and "recovery" purposes with a "contact surface" "high resolution" type sensor would typically include the following steps. Obviously, the following procedure might need to be modified or adapted for various reasons: e.g. learning of contour unknown up-front, fixture calibration required, different measurement sensor, up-front identification of the sensor location, etc.

Step 1:

Define the contour of the tip of the end-effector 12 (FIG. 1) (the portion of the tip, close to the TCP, which is susceptible to contact or intercept the measurement sensor 16) in 3D space with respect to the coordinate frame associated with the TCP to be calibrated: use a parametric function and/or an interpolation table of x, y, z positions (F[TCP]). If TCP orientation needs to be calibrated, define the contour "far enough" also from the TCP's x,y,z in order to provide enough orientation "sensitivity".

Step 2:

Place the measurement sensor 14 anywhere in the working envelope of the robot, but in such a manner that the tip 12A of the end-effector 12 can be driven to a plurality of positions, with a plurality of different configurations of the robot 10, at which there would be contact between the tip 12A of the end-effector 12 and the active sensing area 16 of the sensor 14.

Step 3:

Teach or automatically generate an "initial" calibration robot program containing positions at which the tip 12A of the end-effector 12—within its mathematically described 3D contour—makes contact with the active sensing area 16 of the sensor 14 in its "mid-range". The sensor 14 is in its mid-range when the tip of the end-effector 12 makes contact with the center of (1) the flat surface of the active sensing area 16, or (2) one of the edges 16A of the active sensing area 16, for example, at the mid-travel of a linear displacement sensor. Contacting an edge 16A rather than the flat surface 16 itself is required only when the portion of the tip 12A making contact is linear or concave, in which case the contact with a flat surface 16 would potentially generate more than one contact point. The active sensing area 16 of the sensor 14 should be reached with a plurality of different configurations of the robot which together exercise each axis of the robot as much as possible, yet observe the conditions stated herein. In any event, this calibration program must contain enough robot positions compared to the number of robot, TCP, and sensor location parameters to be calibrated:

depending on the amount of DOFs of the measurement sensor 14, 1 or more measurements will be recorded at each robot position.

Figure 4A:
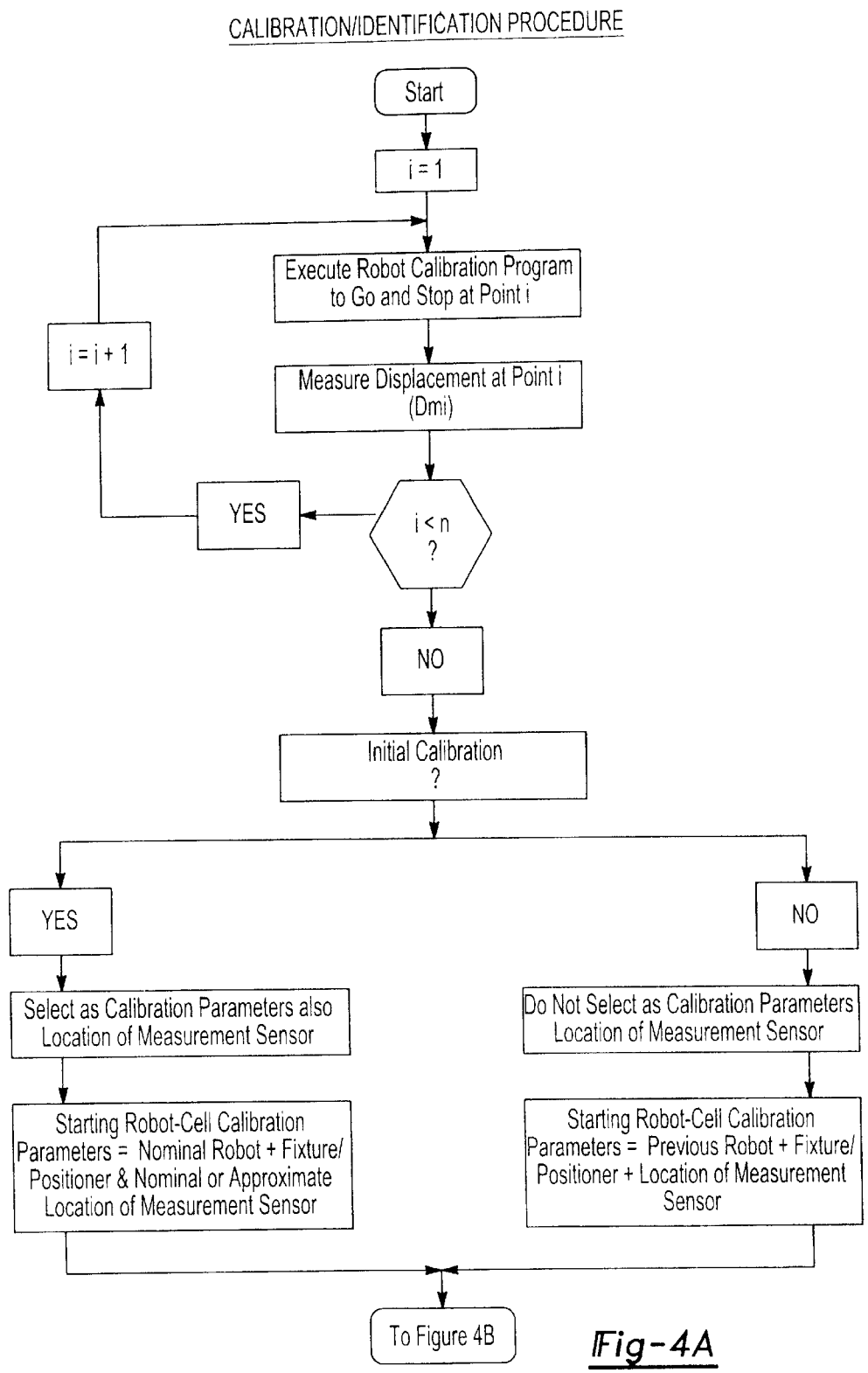
FIGS. 4A and 4B show a flow chart of the method of the present invention.
Figure 4B:
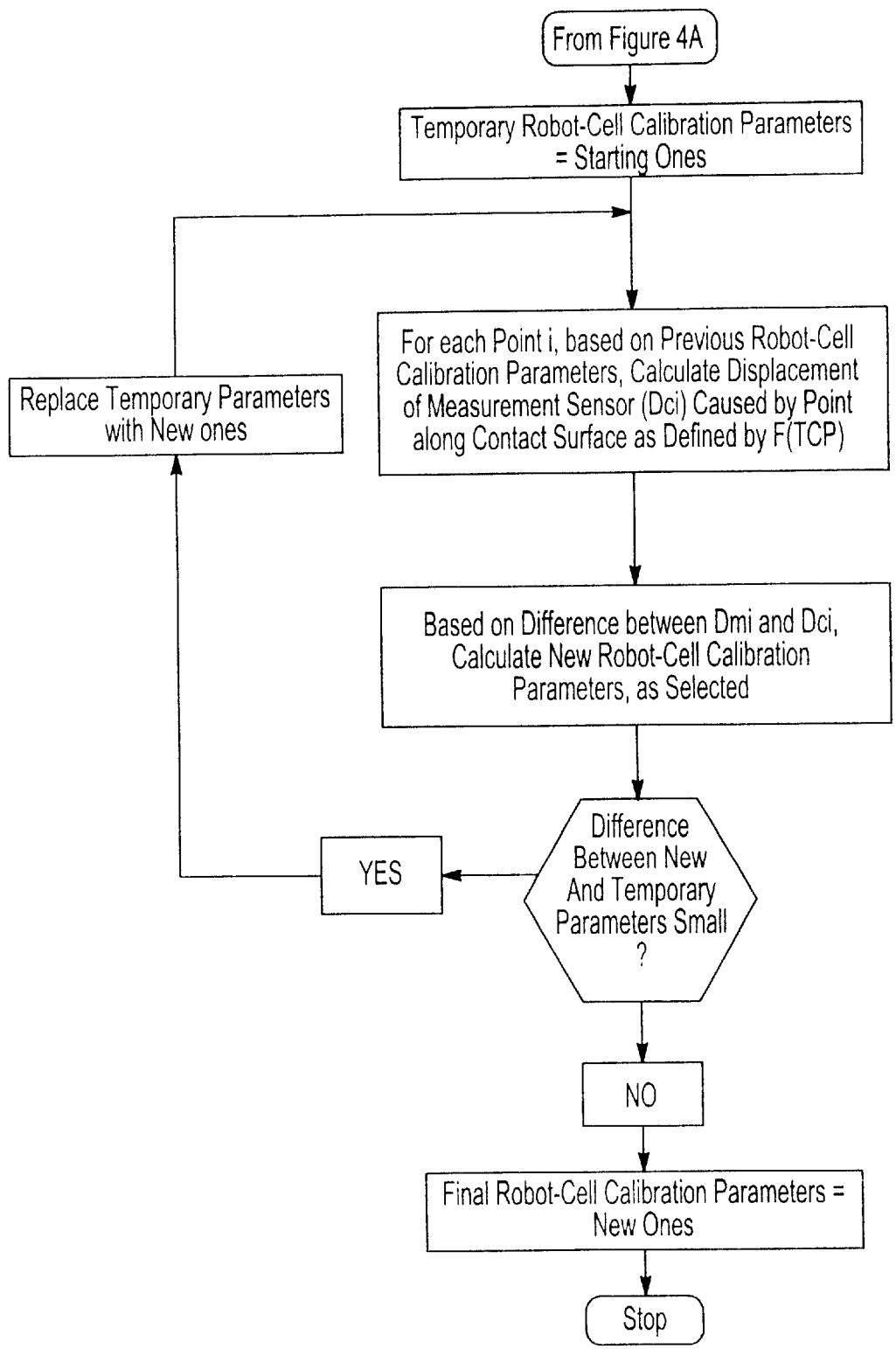

Step 4:

Execute the calibration/identification procedure for "accuracy" purposes as shown in the flow chart of FIG. 4.

Step 5:

Update the "accurate" or initial robot and TCP parameters on the robot controller including one or more of the following: (1) TCP x, y, z (and orientation if applicable); (2) "zero offsets" of each of the robot axes; or (3) additional kinematic parameters if possible. Instead of being updated right on the robot controller, some or all of these parameters can be compensated "off-line" using a standard "filter" approach. Furthermore, the calibrated location of the measurement sensor 14 should be stored within the calibration software for future "recovery" calibration.

Step 6:

Teach or automatically generate a "recovery" calibration robot program containing positions at which the tip 12A of the end-effector 12 makes contact with the active sensing area 16 of the sensor 14 in its "mid-range". This "recovery" calibration program could simply be the same as the "initial" one, however, it does not need to contain as many positions since the location of the measurement sensor 14 no longer needs to be calibrated.

Step 7:

Manually or automatically between each production cycle for example, execute the "recovery" calibration program, execute the calibration/identification procedure for "recovery" purposes (attached hereto as Exhibit D), and update the robot controller (with an "off-line filter" if necessary) for the identified robot and TCP parameters. Alternatively, first run a "quick check" robot program containing only a minimum of robot positions (for example extracted from the "recovery" calibration program) to verify whether or not the robot and/or TCP parameters have indeed changed, and execute the "recovery" calibration program itself then only if necessary.

As should be clear from the description of several preferred embodiments, the present invention provides advantages over the target based and search/feedback systems of robot calibration presently in use. The measurement sensor of the present system provides a convenient, inexpensive and efficient means of providing the necessary position indicating information to a robot calibration means for controlling the precise movement of the robot necessary in many robot applications.

What is claimed is:

1. A system for calibration of a robot comprising:
    a robot carrying an end-effector having a tool center point (TCP) and movable within a working envelope;
    a means for controlling the robot to move the TCP of said end-effector to a plurality of positions within said working envelope;
    a measurement sensor mounted in a known relation to said end-effector;
    means attached to the robot selectively operable to actuate said measurement sensor at a plurality of positions of said robot thereby generating a plurality of measurements;
    a means for mathematically describing a portion of the 3D contour of said attached means;
    a means for calibrating said robot, said TCP of said end-effector, location of said measurement sensor, and said attached means based on a comparison of said mathematically described contour of said mechanical component and said plurality of measurements.

2. The robot-cell calibration system of claim 1 where said measurement sensor consists of one or more movable contact surfaces.

3. The robot-cell calibration system of claim 1 where said measurement sensor consists of one or more "on/off" sensors.

4. The robot-cell calibration system of claim 1 and in which said measurement sensor includes means for directing a laser beam in the path of movement of said end-effector.

5. The robot-cell calibration system of claim 1 where said attached means on the robot is the tip of the end-effector.

6. The robot-cell calibration system of claim 1 where said attached means on the robot is an artifact with a known 3D contour relative to the TCP to be calibrated.

7. The robot-cell calibration system of claim 1 where said 3D contour of said attached means is mathematically described as a function F(TCP) that is known up-front, prior to initiating the calibration process.

8. The robot-cell calibration system of claim 1 where said 3D contour of said attached means is mathematically described as a function F(TCP) that is learned or identified during setup of the calibration process as executed in an end-user's manufacturing environment.

9. A system for calibration of a robot comprising:
    a robot movable within a working envelope and carrying an end-effector having a tool center point (TCP)
    a means for controlling the robot to move the TCP of said end-effector to a plurality of positions within said working envelope;
    a measurement sensor mounted within said working envelope;
    means attached to the robot selectively operable to actuate said measurement sensor at a plurality of positions of said robot thereby generating a plurality of measurements at random locations on said attached means;
    a means for mathematically expressing said locations with respect to said attached means;
    a means for calibrating said robot, the location of said measurement sensor, and said attached means using said mathematical means for calculating said random locations with respect to said attached means at said plurality of robot positions.

10. The robot-cell calibration system of claim 9 where said measurement sensor consists of one or more movable contact surfaces.

11. The robot-cell calibration system of claim 9 where said measurement sensor consists of one or more "on/off" sensors.

12. The robot-cell calibration system of claim 9 and in which said measurement sensor includes means for directing a laser beam in the path of movement of said end-effector.

13. The robot-cell calibration system of claim 9 where said attached means on the robot is the tip of the end-effector along which the TCP is defined.

14. The robot-cell calibration system of claim 9 in which said mathematical means is a function F(TCP).

15. The robot-cell calibration system of claim 9 where said attached means on the robot is an artifact with a known 3D contour relative to the TCP to be calibrated.

16. The robot-cell calibration system of claim 9 where said measurement sensor is mounted in a specific relation to said fixture or positioner to permit additional calibration of said fixture or said positioner.

17. The robot-cell calibration system of claim 9 includes means providing the identification of the initial parameters of said robot, said TCP (x,y,z) and/or orientation) of said end-effector, the location of said measurement sensor, the location of said fixture, and additional parameters, if said fixture itself is a single or multi-axis positioner.

18. The robot-cell calibration system of claim 9 including means providing the identification of the recovery parameters of said robot, said TCP (x,y,z and/or orientation) of said end-effector, the location of said measurement sensor, the location of said fixture, and additional parameters, if said fixture itself is a single or multi-axis positioner after maintenance of the robot-cell.

19. The robot-cell calibration system of claim 9 including means for calibrating said robot and TCP periodically, without operator intervention, between completion of production tasks thereby eliminating the need for further compensation for the effects of temperature and other environmental factors on said robot and the TCP of said end-effector.

20. A method for calibrating a robot, the TCP (x,y,z and orientation) of said robot, as well as the location of a measurement sensor for accuracy and recovery purposes with a contact surface type measurement sensor wherein said robot carries an end-effector having a tool center point (TCP) and said robot is movable within a working envelope; said method including the following steps:

Step 1: Defining the contour of the tip of the end-effector (the portion of the tip, close to the TCP, which is susceptible to contact or intercept the measurement sensor) in 3D space with respect to the coordinate frame associated with the TCP to be calibrated using a parametric function and/or an interpolation table of x, y, z positions F(TCP)

Step 2: Placing the measurement sensor within the working envelope of the robot, in such a manner that the tip of the end-effector can be driven to a plurality of positions, with a plurality of different configurations of the robot, at which there would be contact between the tip of the end-effector and the active sensing area of the sensor;

Step 3: Generating an initial calibration robot program containing positions at which the tip of the end-effector—within its mathematically described 3D contour—makes contact with the active sensing area of the sensor in its mid-range;

Step 4: Executing a calibration/identification procedure for accuracy purposes;

Step 5: Updating the initial robot and TCP parameters on the robot controller including one or more of the following: (1) TCP x, y, z (and orientation if applicable); (2) "zero offsets" of each of the robot axes; or (3) additional kinematic parameters Step 6: Generating a recovery calibration robot program containing positions at which the tip of the end-effector makes contact with the active sensing area of the sensor in its "mid-range; and Step 7: Periodically executing the recovery calibration program to recalibrate the robot to compensate for changes in the robot and the TCP of the robot caused by temperature or other environmental factors.

21. The method for calibrating a robot in accordance with the method defined in claim 20 and in which said program generating step includes the step of identifying the initial parameters of said robot, said TCP (x,y,z and/or orientation) of said end-effector, of the location of said measurement sensor, of the location of said fixture holding the production part, and additional locations of said fixture if said fixture is a multi-axis positioner.

22. The method as defined in claim 20 and including the step of identifying the recovery parameters of said robot, including the location of said TCP (x,y,z and/or orientation) of said end-effector, the location of said measurement sensor, the location of said fixture, and additional parameters, if said fixture is a single or a multi-axis positioner following maintenance of the robot-cell.

23. The method as defined in claim 20 and including the step of calibrating said robot and TCP periodically, without operator intervention, between completion of production tasks thereby eliminating the need for further compensation for the effects of temperature and other environmental factors on said robot and the TCP of said end-effector.

24. The method for calibrating a robot as defined in claim 20 and in which said robot includes a base frame carrying said fixture and said fixture carries a production part, said method including the step of identifying the location of said fixture relative to said base frame of said robot.

* * * * *